VARIABLE CAPACITOR ANALOG TO DIGITAL CONVERSION

Filed May 9, 1962

INVENTORS
IRWIN SHAIR &
ROBERT H. COLBOURNE
BY John V. Regan
ATTORNEY

United States Patent Office 3,237,188

Patented Feb. 22, 1966

3,237,188

VARIABLE CAPACITOR ANALOG TO DIGITAL CONVERSION

Irwin S. Shair, Boston, and Robert H. Colbourne, Lexington, Mass., assignors to Radio Corporation of America, a corporation of Delaware Filed May 9, 1962, Ser. No. 193,417
4 Claims. (Cl. 340—347)

This invention relates primarily to a circuit for producing an electrical indication of the magnitude of a condition.

The variable condition, which may be considered to be a physical analog function, may, for example, be a pressure produced by a thrust producing machine. The pressure to be measured is applied to a pressure sensitive impedance, which may be a condenser. The change in the value of the capacity due to the pressure applied thereto, in a specially advantageous application of this invention, causes the production of a display which indicates the magnitude of the pressure, preferably numerically or digitally. Since the condition sensitive impedance normally also is sensitive to ambient conditions, such as temperature, which tend to mask the impedance change caused by the pressure, a second identical condition sensitive impedance is so placed that it is exposed to the same conditions as the first impedance, except that no pressure is applied thereto. The difference of impedances of the two condition sensitive impedances is then a measure of the pressure applied to one of them.

It is an object of this invention to provide a circuit for producing two pulses separated in time in accordance with a given condition in response to the application to the circuit of an input pulse.

It is an object of this invention to provide a circuit for indicating the change in impedance of a condition sensitive impedance digitally.

It is an object of this invention to provide a circuit for indicating the change in impedance of a condition sensitive impedance as a time interval.

It is an object to provide a circuit for indicating digitally the difference of impedance of two condition sensitive impedances.

It is a further object of this invention to provide a multivibrator circuit to which a pulse may be applied and which will produce a pair of pulses whose trailing edges are separated in time by an amount depending on the amplitude of the difference in value of a pair of elements in said multivibrator circuit.

The embodiment of this invention described herein comprises a pair of identical monostable multivibrators, each including a pair of impedances which together make up a time constant circuit. At least one of the impedances in the one time constant circuit is variable in response to a condition or state to be sensed. Means are provided to apply to a counting circuit the pulses produced by the monostable multivibrators in response to an input pulse which is simultaneously applied to the both thereof.

This invention may be better understood by reference to the several figures of the accompanying drawing taken with the following detailed description. In the drawing.

Figure 1:
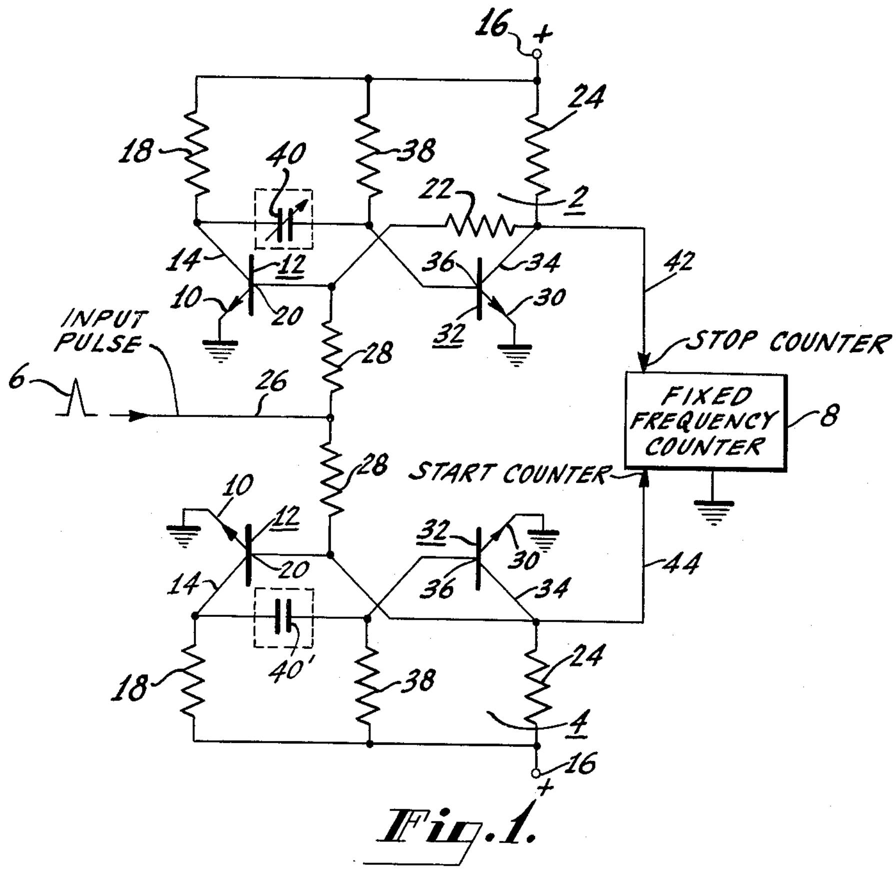
FIG. 1 is a circuit diagram of a preferred form of this invention.

Referring to FIG. 1, a pair of monostable multivibrators 2 and 4 are provided. An input pulse 6 is applied simultaneously to the multivibrators 2 and 4, and the outputs of the multivibrators are applied individually to the fixed frequency counter 8.

Monostable multivibrator 2 will be described in detail first. The emitter 10 of transistor 12 of multivibrator 2 is connected to ground. The collector 14 of transistor 12 is connected to the terminal 16 of a source of direct voltage through resistor 18. The base 20 of transistor 12 is connected to terminal 16 through resistors 22 and 24 in series. The emitter 30 of a further transistor 32 is connected to ground and the collector 34 of transistor 32 is connected to terminal 16 through resistor 24. The base 36 of transistor 32 is connected to terminal 16 through resistor 38. A condition variable condenser 40 is connected between the base 36 and the collector 14. The condenser 40 and resistor 38 act as a pair of impedances which together make up the time constant circuit of multivibrator 2. Since condenser 40 will be exposed to the condition to be measured as well as to ambient conditions, an arrow has been drawn through condenser 40 to indicate that it is variable by conditions to which it is exposed.

Multivibrator 4 is identical with multivibrator 2, however since the condensor 40′ thereof will be exposed to other ambient conditions but not to the condition to be measured, condenser 40′ is not indicated as being variable. It is to be understood, however, that condensers 40 and 40′ are electrically as nearly alike as reasonably possible.

The input pulse 6 is applied to each base 20 in each multivibrator 2 and 4 by way of common lead 26 and by way of individual resistors 28. The output of multivibrator 2 is taken from across resistor 24 thereof by conductor 42 and is applied to an input of a known fixed frequency counter 8 such as Hewlett Packard Counter type 524B. The output pulse of multivibrator 4 is taken from across resistor 24 thereof and is applied to another input of counter 8 by conductor 44. As will be explained, the lagging edge of one of these output pulses starts counter 8 to produce pulses and the lagging edge of the other output pulse stops counter 8, and the number of pulses produced by the counter and which is indicated thereby, is a measure of the condition to which condenser 40 only has been exposed, that is, the counter indication is a digital indication of a mechanical analog function.

While the elements comprising multivibrators 2 and 4 may have many convenient values, like elements being as nearly alike as possible, it may be desirable to choose time constant resistor 38 of a value of $$\frac{10^5}{\log_n 2}=144.33$$

thousand ohms approximately. If this value is used for the resistance 38, then the time interval between the trailing edges of the output pulses of the two monostable multivibrators 2 and 4 in microseconds will be equal to the difference in micromicrofarads times ten in capacity of condensers 40 and 40′ resulting from the application of the condition to be measured to condenser 40 but not to condenser 40′, all other ambient conditions being as nearly the same as possible. Other specific component values may be used to provide desired calibration relative to the variable condition.

Figure 2:
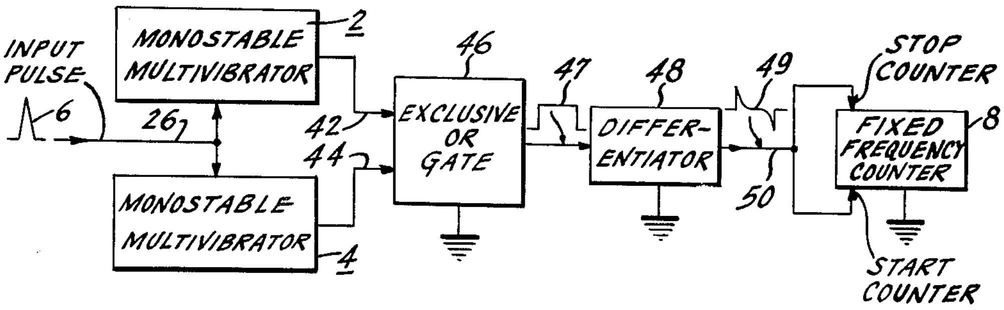
FIG. 2 is a circuit diagram of a modification of this invention.

Since the pulse output of the two multivibrators 2 and 4 overlap, individual conductors are supplied to apply the outputs of the multivibrators 2 and 4 individually to start and stop connections of the known counter 8. If it be desired to position the counter 8 remotely from the multivibrator, it is advantageous to employ one conductor to supply both start and stop pulses to the counter 8. FIG. 2 illustrates such a control of the counter 8.

As shown in FIG. 2, the outputs of multivibrations 2 and 4, which are identical to the multivibrators of FIG. 1, are applied by way of conductors 42 and 44 to a known "exclusive or" gate circuit 46. An "exclusive or" gate emits a pulse during the time when one or the other, but not both, of two input pulses are applied to it. An example of such a circuit may be found in "Pulse and Digital Circuits" by Millman and Taub, McGraw-Hill, 1956 at page 411. When the two overlapping pulses having the same starting time are applied to such a gate circuit, therefore, this gate circuit provides an output pulse 47 only during the period of time after the pulse from multivibrator 4 has expired and for the period during which the pulse from multivibrator 2 still continues to exist. The width of the output pulse 47 from "exclusive or" gate 46 is therefore a measure of the interval between the lagging edge of the output pulse from multivibrator 2 and the lagging edge of the output pulse from multivibrator 4. This "rectangular" pulse 47 is applied to a known differentiator 48 which provides as an output thereof, a positive and negative pulse, indicated at 50, which are spaced in time substantially equal to the length of pulse 47. The two pulses are applied by way of a common lead 50 to both the stop and start terminals of counter 8.

The operation of the circuit of FIG. 1 is as follows: the condition to be measured is applied to variable capacitor 40. The capacity 40′ is put close to capacitor 40, so that it will be exposed to the same ambient conditions, but the condition to be measured is not applied thereto. Therefore, the difference in capacity of condensers 40 and 40′ will be an indication of the condition to be measured. If the condition to be measured is pressure, a pressure sensitive capacitor is chosen for capacitor 40 and a capacitor 40′ is chosen which responds to ambient conditions similarly to capacitor 40. Pressure sensitive condensers are known and no example thereof need be given. A pulse 6 is applied simultaneously to the inputs of monostable multivibrators 2 and 4 and each multivibrator 2 and 4, as is known, will go through its cycle once, thereby producing an output pulse in lines 42 and 44, respectively. These output pulses, however will not be identical. They will start simultaneously but their lagging edges will be separated by a time interval dependent on the difference of capacity of condensers 40 and 40′. An increase of capacity 40 relative to capacity 40′ due to the condition to be measured will cause expiration of the output pulse from multivibrator 4 before expiration of output pulse from multivibrator 2, and a relative decrease in capacity 40 will cause the opposite succession of expirations of output pulses. The first lagging edge applied to counter 8 will cause the counter 8 to start producing pulses in a known manner. The later lagging edge of the other pulse applied to counter 8 will stop it from counting pulses, and the indicator comprising a known part of counter 8 will thereby indicate a digital number which will be a measure of the difference of the capacity of capacitors 40 and 40′, and therefore of the amount of pressure applied to capacity 40. It is clear that capacity 40 may be chosen to be responsive to other conditions to be measured such as temperature, humidity, and so forth. The resistor 38 of monostable multivibrator 2 also may be used, if desired, in place of the capacitor 40 as the condition sensitive element. In such case the resistors 38 of the multivibrators 2 and 4 are placed in close proximity to each other.

In the operation of the circuit of FIG. 2, the two output pulses from multivibrators 2 and 4 are applied to the "exclusive or" gate 46, which produces a square wave 47 whose duration is a measure of the difference in capacity of condensers 40 and 40′. The square pulse 47 is applied to differentiator 48 which produces a pair of pulses 49 of opposite polarity whose spacing is a measure of this difference of capacity. Both pulses 49 are applied to counter 8 by common lead 50, the first pulse of the pair starting the counter and the second pulse of the pair stopping the counter. As previously noted, the counter indicates a digital value which is a measure of the condition to be indicated.

The circuits of this invention produce a digital readout of a sensing element. That is, a numerical output which is a measure of a sensed parameter is provided which is useful in digital systems. Numerical values may be in decimal, binary or other systems, or the time interval between the expiration of the pulses may itself be a measure of the condition to be measured. The circuits of this invention also permit integration of several sensing elements into a single digital system.

What is claimed is:

1. A circuit for producing a numerical readout of a change in value of an impedance comprising.
 a pair of monostable multivibrators,
 each multivibrator including a plurality of impedances comprising a time constant circuit,
 at least one of said impedances of one time constant circuit being variable,
 means for applying an input pulse simultaneously to both of said multivibrators to cause each of said multivibrators to go through its cycle of operation,
 means to apply an output produced by each of said multivibrators to an "exclusive or" gate circuit,
 whereby a rectangular pulse is produced by said gate circuit,
 means to apply said rectangular wave to a differentiator circuit,
 whereby a pair of spaced pulses are produced by said differentiator circuit,
 and means to measure the time between said pair of pulses.

2. A circuit for producing a numerical readout of a change in value of an impedance comprising
 a pair of monostable multivibrators,
 each multivibrator including a plurality of impedances comprising a time constant circuit,
 at least one of said impedances of one time constant circuit being variable,
 means for applying an input pulse simultaneously to both of said multivibrators to cause each of said multivibrators to go through its cycle of operation,
 means to apply an output produced by each of said multivibrators to an "exclusive or" gate circuit,
 whereby a rectangular pulse is produced by said gate circuit,
 means to apply said rectangular wave to a differentiator circuit,
 whereby a pair of spaced pulses are produced by said differentiator circuit,
 and means to apply said pair of pulses to a frequency counter,
 whereby one of said last mentioned pulses starts said counter and the other of said last mentioned pulses turns the counter off.

3. A circuit for producing a digital measure of a magnitude of a condition comprising
 a pair of multivibrators whose inputs are connected together and having individual outputs,
 each multivibrator comprising individually a pair of transistors,
 means for grounding the emitters of both of said transistors,
 means for applying a potential to the collectors of both of said transistors,
 means for connecting a condenser between the collector of one of said transistors and the base of said other transistor of said pair,
 means including a resistor for applying a potential to the base of said other transistors of said pair,
 and means for connecting a resistor from the collector of the other of said transistors to the base of said one transistor,
 the time constant of said multivibrators being proportional to the product of the impedances of said first mentioned resistor and condenser,
 one of said first mentioned resistors and condensers being variable in response to the magnitude of said condition to vary the time constant of a multivibrator, means to apply a pulse simultaneously to the bases of said one transistors of said multivibrators, and means to apply pulses individually taken from the collectors of said other transistors of said pair of multivibrators to a frequency counter, whereby one pulse applied to said counter turns the counter on and the other pulse applied to the counter turns the counter off.

4. A circuit for producing a digital measure of a magnitude of a condition, comprising a pair of monostable multivibrators each including first and second grounded-emitter transistors and each including a resistor-capacitor time constant circuit between the collector of said second transistor and the base of said first transistor, one of said capacitors being variable in response to the magnitude of a condition to be measured, means to apply an input trigger pulse simultaneously to the bases of said first transistors of both of the multivibrators of said pair, an "exclusive or" gate having inputs coupled to receive output pulses from the collectors of said second transistors of both multivibrators, a differentiator circuit having an input coupled to the output of said "exclusive or" gate, and a fixed frequency counter having "start" and "stop" inputs coupled to the output of said differentiator circuit.

References Cited by the Examiner

UNITED STATES PATENTS

| | | | |
|---|---|---|---|
| 2,918,625 | 12/1959 | Houghton et al. | 324—68.1 X |
| 2,964,708 | 12/1960 | Steele | 304—68 |
| 2,967,953 | 1/1961 | Pribble | 307—88.5 |
| 2,987,717 | 6/1961 | Altonji et al. | 340—347 |
| 3,042,859 | 7/1962 | Shellengton | 324—68 |

MALCOLM A. MORRISON, *Primary Examiner.*